Patented Feb. 25, 1930

1,748,781

UNITED STATES PATENT OFFICE

ERWIN S. MARTIN, OF EAST ORANGE, NEW JERSEY, ASSIGNOR, BY MESNE ASSIGNMENTS, TO K-P-C COMPANY, A CORPORATION OF ILLINOIS

CHEESE AND PROCESS OF PREPARING THE SAME

No Drawing. Application filed November 5, 1927. Serial No. 231,394.

My invention relates to cheeses and to improved processes for treating the same, for the purpose of conferring upon the cheeses a smooth texture, preventing the separation of the butter fats, thus avoiding the trouble known in this art as oiling off, and also rendering the product when finished homogeneous in texture and delicate in taste, and to improve its tasting qualities.

My invention further contemplates improvement of the cheeses by the addition thereto of certain hereinafter mentioned dairy products, under suitable conditions, so that the finished product is to all intents and purposes a form of cheese which is agreeable to the taste and which has all of the well known characteristics of a typical cheese, the ingredients being thoroughly blended into a mass which is homogeneous and has a strong tendency to remain so; not only while the mass is heated incidental to its sterilization or pasteurization, but after the completion of the process, when the finished product is subjected to high room temperature or to undue heating from climatic conditions.

My invention is applicable to practically any kind of commercial cheese, including Cheddar, Camembert, Limburger, Swiss and Roquefort, cream cheese and cottage cheese.

As the several of modes of treatment coming within the spirit of my invention may be varied to some extent, dependent upon the characteristics of the cheese, I will describe as typical the treatment of Cheddar cheese. This is as follows:—

The cheese is ground or sliced into small pieces and poured into a kettle, where it is mixed with dairy products, namely milk, cream or butter, as the case may be. The quantity of the dairy products thus added may be from twenty-five to fifty per cent of the original weight of the cheese, or the percentage may be even larger.

The kettle with its contents is now heated to a temperature of approximately 165 degrees Fahrenheit, and stirred vigorously while thus heated, so that the entire mass becomes liquid and acquires a consistency which is best described as limpid, and whereby it is adapted to flow freely.

A mulsifier may be added along with the other ingredients, or not, as the operator may consider desirable. If a mulsifier is to be used, it may consist of a small percentage of a suitable alkaline salt, for instance sodium citrate, or a citrate having an alkaline base other than sodium, all as described in patents numbered 1,389,095 August 31, 1921, and 1,389,577 September 6, 1921, to Carpenter and Eldridge; or a small percentage of sodium phosphate may be used, as described in patent to Eldridge, Reissue, 15,648 of July 10, 1922. Sodium citrate is excellent, and may be one to two per cent, by weight, of the entire mass.

In the event that no mulsifier is to be used, the mulsification may be brought about by the sole agency of continuing the heating and stirring, preferably at a temperature above stated, for about thirty minutes. A little water may be added at the start if desirable.

The entire mass, with or without the addition of a mulsifier, is next passed through a viscolizer. This is a machine sometimes known as a homogenizer, and used in various arts for conferring a predetermined or desirable degree of viscosity upon a liquid or plastic mass suitable for the purpose. Such machines are commonly used in preparing custards to be frozen into ice cream, and in mixing mayonnaise ingredients; also upon mixtures of milk and cream, in the manufacture of cream cheese.

I do not deem it necessary to describe the machines just mentioned, further than to state that they operate upon a liquid or plastic mixture by continuously forcing it under pressure through small openings, the pressure being quite heavy, and preferably about 3,000 pounds per square inch.

My purpose in passing the cheese mass through the viscolizer is to improve the texture of the mass. I find that the cheese mixture above described, in passing through the viscolizer under the conditions above set forth, becomes smooth in texture and fluffy in appearance; that the various ingredients are thoroughly blended; that the butter fats lose their tendency to separate from the casein with which they are closely associated;

and that after this treatment the mass tends to maintain these conditions. The net result is that the passage of the material through the viscolizer confers upon the mass such a condition that when it is then or thereafter exposed to warm room temperatures, or to warm climatic conditions, the fault known in this art as oiling off does not take place, and there is no appreciable separation of butter fats. I also find that the mass, after its passage through the viscolizer, has a persistent tendency to remain smooth, or in other words does not become grainy.

The cheese mass treated as above described is found in practice to be thoroughly pasteurized, and to have good keeping qualities.

The mass, while still hot, is next run or poured from the kettle into cans or jars and hermetically sealed, after which these containers with their contents may be subjected to further heating, should this be desirable in order to still further improve the keeping qualities of the cheese.

In instances where the cheese is not to be subjected to conditions unfavorable to its keeping, the cheese mass while hot can be run or poured into cartons or boxes, lined with tin foil or not. By reducing to a minimum the heat treatment required in order to maintain in the finished cheese a good keeping quality, the flavor may be somewhat improved.

Cheeses prepared as above described are perfectly blended and will keep for long periods of time.

I do not limit myself to the exact procedure above set forth, nor to the precise product above described, as variations may be made therein without departing from my invention, the scope of which is commensurate with my claims.

Having thus described my invention, what I claim as new and desire to secure by Letters Patent is as follows:—

1. The method herein described of treating a cheese mass, which consists in pasteurizing and viscolizing the mass, and then subjecting the mass to a separate step of heating.

2. The method herein described of producing a cheese mass, which consists in adding to cheese other edible dairy products capable of blending therewith, heating and stirring the mass in order to pasteurize the same, and viscolizing the mass.

3. The method herein described of treating an edible mass containing a preponderance of cheese, which consists in pasteurizing the mass and viscolizing the same.

4. The method herein described of producing a cheese mass, which consists in adding to cheese other edible dairy products, pasteurizing the mass by heating and stirring, viscolizing the mass, and running the mass, after viscolizing, into suitable containers.

5. The cheese mass herein described containing cheese and other edible dairy products, the mass being viscolized and having a consistency smooth and fluffy.

Signed at San Francisco, in the county of San Francisco and State of California, this 1st day of November, 1927.

ERWIN S. MARTIN.